US012620507B2

(12) United States Patent
Kobayashi et al.

(10) Patent No.: US 12,620,507 B2
(45) Date of Patent: May 5, 2026

(54) IN-VEHICLE COMMUNICATION SYSTEM AND COMMUNICATION CABLE

(71) Applicant: SUMITOMO WIRING SYSTEMS, LTD., Mie (JP)

(72) Inventors: Kenta Kobayashi, Mie (JP); Kenichiro Iwama, Mie (JP); Ayumu Minagawa, Mie (JP)

( * ) Notice: Subject to any disclaimer, the term of this patent is extended or adjusted under 35 U.S.C. 154(b) by 220 days.

(21) Appl. No.: 18/702,049

(22) PCT Filed: Oct. 3, 2022

(86) PCT No.: PCT/JP2022/036934
§ 371 (c)(1),
(2) Date: Apr. 17, 2024

(87) PCT Pub. No.: WO2023/068025
PCT Pub. Date: Apr. 27, 2023

(65) Prior Publication Data
US 2025/0239383 A1      Jul. 24, 2025

(30) Foreign Application Priority Data

Oct. 21, 2021    (JP) ................................. 2021-172592
May 27, 2022    (JP) ................................. 2022-086604

(51) Int. Cl.
| | |
|---|---|
| *H01B 7/18* | (2006.01) |
| *B60R 16/023* | (2006.01) |
| *H01B 7/38* | (2006.01) |
| *H01B 11/04* | (2006.01) |

(52) U.S. Cl.
CPC .......... *H01B 7/184* (2013.01); *B60R 16/023* (2013.01); *H01B 7/38* (2013.01); *H01B 11/04* (2013.01)

(58) Field of Classification Search
CPC .......... H01B 7/184; H01B 7/38; H01B 11/02; H01B 11/06; H01B 7/18
USPC ....................................................... 174/113 R
See application file for complete search history.

(56) References Cited

U.S. PATENT DOCUMENTS

| | | |
|---|---|---|
| 2010/0304160 A1 | 12/2010 | Fukukawa et al. |
| 2014/0353029 A1 | 12/2014 | Tsubouchi |
| 2019/0355492 A1 | 11/2019 | Uegaki et al. |

FOREIGN PATENT DOCUMENTS

| | | |
|---|---|---|
| JP | 2010-123461 A | 6/2010 |
| JP | 2014-139115 A | 7/2014 |
| JP | 2020-120242 A | 8/2020 |

OTHER PUBLICATIONS

International Search Report issued on Dec. 13, 2022 for WO 2023/068025 A1 (4 pages).

*Primary Examiner* — Tremesha W Burns
(74) *Attorney, Agent, or Firm* — Venjuris, P.C.

(57)              ABSTRACT

An in-vehicle communication system includes a transmitter that transmits a differential signal, a receiver that receives the differential signal, and a communication cable that connects between the transmitter and the receiver and transmits the differential signal. The communication cable includes a twisted wire, a sheath covering the twisted wire, and a talc layer provided between the twisted wire and the sheath. The sheath includes a pair of ribs located across a straight line connecting a conductor center of a first coated wire and a conductor center of a second coated wire in a transverse section of the communication cable. The talc layer is provided along the surface of the twisted wire.

11 Claims, 7 Drawing Sheets

FIG. 7

| | | SAMPLES | | | | | |
|---|---|---|---|---|---|---|---|
| | S1 | S2 | S3 | S4 | S5 | S6 | S7 |
| PROVISION OF RIBS | YES | YES | YES | YES | YES | YES | YES |
| AVERAGE PARTICLE SIZE OF TALC POWDER [μm] | 1 | 2 | 3 | 4 | 6 | 12 | 20 |
| SHEATH HARDNESS | OPTIMAL | OPTIMAL | OPTIMAL | OPTIMAL | OPTIMAL | OPTIMAL | OPTIMAL |
| CHARACTERISTIC IMPEDANCE EVALUATION BEFORE BENDING | △ | ○ | ◎ | ◎ | ◎ | ○ | △ |
| CHARACTERISTIC IMPEDANCE EVALUATION IN BENT STATE | △ | ○ | ◎ | ◎ | ◎ | ○ | △ |
| CHARACTERISTIC IMPEDANCE EVALUATION AFTER REPEATED BENDING | △ | ○ | ◎ | ◎ | ◎ | ○ | △ |
| STRIPPABILITY EVALUATION | △ | ○ | ◎ | ◎ | ◎ | ◎ | ◎ |

*FIG. 8*

| | SAMPLES | | | | | | |
|---|---|---|---|---|---|---|---|
| | S8 | S9 | S10 | S11 | S12 | S13 | |
| PROVISION OF RIBS | NO | YES | YES | YES | YES | YES | |
| AVERAGE PARTICLE SIZE OF TALC POWDER [μm] | 4 | 4 | 4 | 4 | 4 | – (NO) | |
| SHEATH HARDNESS | OPTIMAL | SOFT | FAIRLY SOFT | FAIRLY HARD | HARD | OPTIMAL | |
| CHARACTERISTIC IMPEDANCE EVALUATION BEFORE BENDING | ◎ | ◎ | ◎ | ◎ | ◎ | ◎ | |
| CHARACTERISTIC IMPEDANCE EVALUATION IN BENT STATE | △ | ○ | ◎ | ○ | – | ◎ | |
| CHARACTERISTIC IMPEDANCE EVALUATION AFTER REPEATED BENDING | × | ○ | ○ | ○ | – | ◎ | |
| STRIPPABILITY EVALUATION | ◎ | ○ | ○ | ○ | △ | × | |

IN-VEHICLE COMMUNICATION SYSTEM AND COMMUNICATION CABLE

CROSS REFERENCE TO RELATED APPLICATIONS

This application is a national phase of PCT application No. PCT/JP2022/036934, filed on 3 Oct. 2022, which claims priority from Japanese patent application Nos. 2021-172592 and 2022-086604, filed on Oct. 21, 2021 and May 27, 2022, respectively, all of which are incorporated herein by reference.

TECHNICAL FIELD

The present disclosure relates to an in-vehicle communication system and a communication cable.

BACKGROUND

Patent Document 1 discloses an interface circuit of a communication device that performs signal transmission between electrical devices in a vehicle. In the communication device of Patent Document 1, the signal transmission line of the interface circuit is constituted by a pair of differential transmission lines.

PRIOR ART DOCUMENT

Patent Document

Patent Document 1: JP 2020-120242 A

SUMMARY OF THE INVENTION

Problems to be Solved

In Patent Document 1, the pair of differential transmission lines in the interface circuit are connected to a cable via a connector. It is desirable to maintain a distance between conductors of the cable.

In view of this, an object is to facilitate maintaining a distance between conductors of a cable installed in a vehicle.

Means to Solve the Problem

An in-vehicle communication system of the present disclosure includes a transmitter configured to transmit a differential signal, a receiver configured to receive the differential signal, and a communication cable connecting between the transmitter and the receiver and configured to transmit the differential signal, the communication cable including a twisted wire in which a first coated wire and a second coated wire are twisted together, a sheath covering the twisted wire, and a talc layer provided between the twisted wire and the sheath, the sheath including a tubular part surrounding the first coated wire and the second coated wire, and a pair of ribs each extending spirally in an extension direction of the communication cable while protruding inward of the communication cable from the tubular part to between the first coated wire and the second coated wire, the pair of ribs, in a transverse section of the communication cable, being located across a straight line connecting a conductor center of the first coated wire and a conductor center of the second coated wire, so as to demarcate a first space in which the first coated wire is disposed and a second space in which the second coated wire is disposed, and the talc layer being provided along a surface of the twisted wire.

Effect of the Invention

According to the present disclosure, maintaining a distance between conductors of a cable installed in a vehicle is facilitated.

BRIEF DESCRIPTION OF THE DRAWINGS

FIG. 7 is a diagram showing evaluation results of communication cables.

FIG. 8 is a diagram showing evaluation results of communication cables.

DETAILED DESCRIPTION TO EXECUTE THE INVENTION

Description of Embodiments of Disclosure

Figure 1:
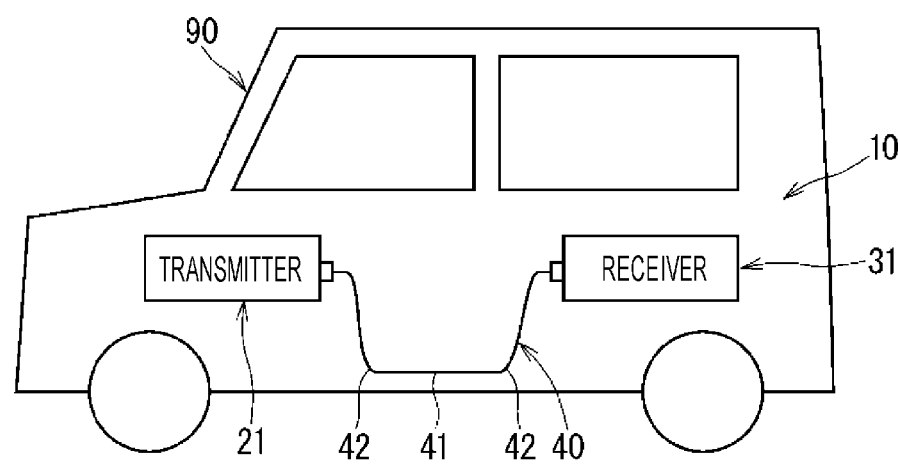
FIG. 1 is a schematic diagram showing an in-vehicle communication system according to a first embodiment.

Initially, modes of the present disclosure will be enumerated and described.

An in-vehicle communication system of the present disclosure is as follows.

(1) An in-vehicle communication system including a transmitter configured to transmit a differential signal, a receiver configured to receive the differential signal, and a communication cable connecting between the transmitter and the receiver and configured to transmit the differential signal, the communication cable including a twisted wire in which a first coated wire and a second coated wire are twisted together, a sheath covering the twisted wire, and a talc layer provided between the twisted wire and the sheath, the sheath including a tubular part surrounding the first coated wire and the second coated wire, and a pair of ribs each extending spirally in an extension direction of the communication cable while protruding inward of the communication cable from the tubular part to between the first coated wire and the second coated wire, the pair of ribs, in a transverse section of the communication cable, being located across a straight line connecting a conductor center of the first coated wire and a conductor center of the second coated wire, so as to demarcate a first space in which the first coated wire is disposed and a second space in which the second coated wire is disposed, and the talc layer being provided along a surface of the twisted wire. According to the in-vehicle communication system constituted in this way, the talc layer is provided along the surface of the twisted wire, and thus does not impede the ribs from entering between the first coated wire and the second coated wire. Because the positions through which the first coated wire and the second coated wire pass can be regulated by the pair of ribs, it is thereby possible to reduce noise caused by variation in the relative positional relationship between the wires of the twisted wire, which is a problem with the communication cable. Furthermore, the talc layer facilitates stripping the sheath of the communication cable.

(2) In the in-vehicle communication system according to (1), a section of the communication cable in the extension direction may be a straight section extending in a straight line, and another section thereof may be a bent section extending in a bent manner, and the pair of ribs may demarcate the first space and the second space in both the straight section and the bent section. The positional relationship between the first coated wire and the second coated wire can thereby be favorably regulated in both the straight section and the bent section.

(3) In the in-vehicle communication system according to (2), an inter-conductor distance between the first coated wire and the second coated wire may be constant in both the straight section and the bent section. It is thereby possible to reduce noise caused by variation in the relative positional relationship between the wires of the twisted wire, which is a problem with the communication cable.

(4) In the in-vehicle communication system according to any one of (1) to (3), the pair of ribs may be provided to extend throughout an entire length of the sheath. The positional relationship between the first coated wire and the second coated wire can thereby be favorably regulated throughout the entire length of the sheath.

(5) In the in-vehicle communication system according to any one of (1) to (4), distal ends of the paired ribs may be spaced apart from each other, and, between the paired ribs, the first space and the second space may communicate with each other, and an insulating coating of the first coated wire and an insulating coating of the second coated wire may be in direct contact with each other not via the talc layer. The inter-conductor distance between the first coated wire and the second coated wire and the diameter of the communication cable can thereby be reduced.

(6) In the in-vehicle communication system according to any one of (1) to (5), a pitch of spirals of each of the paired ribs may be set to be constant throughout an entire length of the section in which the pair of ribs are provided. The pitch of the first coated wire and the second coated wire that pass through the first space and the second space that are demarcated by the pair of ribs is thereby easily kept at a constant pitch.

(7) In the in-vehicle communication system according to any one of (1) to (6), one end portion and an opposite end portion of the communication cable in the extension direction may be sheath outer sections in which the twisted wire extends outside the sheath, and a first connector for connecting the twisted wire to the transmitter may be provided in the sheath outer section of the one end portion, and a second connector for connecting the twisted wire to the receiver may be provided in the sheath outer section of the opposite end portion. The communication cable can thereby be easily connected to both the transmitter and the receiver.

(8) In the in-vehicle communication system according to any one of (1) to (7), the sheath may cover only the twisted wire and the talc layer. The structure of the communication cable is thereby simplified and costs are reduced.

(9) In the in-vehicle communication system according to any one of (1) to (8), powdered talc of the talc layer may include magnesium hydroxide and silicate, the powdered talc may be white in color, and the sheath may be a different color from the powdered talc. Completion of stripping when the sheath is stripped is thereby easily recognized by checking the color of the stripped portion.

(10) In the in-vehicle communication system according to any one of (1) to (9), the powdered talc of the talc layer may have an average particle size from 1 $\mu$m to 20 $\mu$m. Favorable strippability and favorable characteristic impedance are thereby easily obtained in the communication cable.

(11) In the in-vehicle communication system according to any one of (1) to (10), a value of characteristic impedance of the communication cable in a bent state may be from 94 $\Omega$ to 106 $\Omega$ inclusive measured with a characteristic impedance measurement method conforming to a measurement method defined in IEC 62153-1-1, except for a measurement sample being measured in a bent posture instead of a typical straight posture, where the bent posture is a posture in which an intermediate portion of the measurement sample is bent once around to form a loop having a bending radius of 20 mm, and the loop is hollow inside. Favorable characteristic impedance can thereby be easily obtained, even if the communication cable is disposed in the vehicle in a bent manner.

(12) In the in-vehicle communication system according to any one of (1) to (11), the value of the characteristic impedance of the communication cable may be from 94$\Omega$ to 106$\Omega$ inclusive measured with the measurement method conforming to IEC 62153-1-1, after a fatigue test that is defined in ISO 19642-2 and uses a weight of 300 g and a mandrel having a diameter of 15 mm. The communication cable installed in the vehicle is prone to being repeatedly bent due to vibration and the like. Favorable characteristic impedance is also easily obtained in this case, even with the communication cable after long-term use, due to the value of characteristic impedance after a fatigue test that is defined in ISO 19642-2 and uses a weight of 300 g and a mandrel having a diameter of 15 mm being from 94$\Omega$ to 106$\Omega$ inclusive.

(13) Also, a communication cable of the present disclosure is a communication cable for use in an in-vehicle communication system configured to transmit and receive a differential signal, the communication cable including a twisted wire in which a first coated wire and a second coated wire are twisted together, a sheath collectively covering the twisted wire, and a talc layer provided between the twisted wire and the sheath, the sheath including a tubular part surrounding the first coated wire and the second coated wire, and a pair of ribs each extending spirally in an extension direction of the communication cable while protruding inward of the communication cable from the tubular part to between the first coated wire and the second coated wire, the pair of ribs, in a transverse section of the communication cable, being located across a straight line connecting a conductor center of the first coated wire and a conductor center of the second coated wire, so as to demarcate a first space in which the first coated wire is disposed and a second space in which the second coated wire is disposed, and the talc layer being provided along a surface of the twisted wire. Noise can thereby be reduced in an in-vehicle communication system in which differential signals are transmitted and received using the communication cable.

Detailed Description of Embodiments of Disclosure

Specific examples of an in-vehicle communication system of the present disclosure will be described below with reference to the drawings. Note that the present disclosure is not limited to these illustrative examples and is indicated by the claims, and all changes that come within the meaning and range of equivalency of the claims are intended to be embraced therein. Regarding JIS, ISO, IEC and other standards, the latest versions at the time of filing are adopted below unless stated otherwise.

First Embodiment

Figure 2:
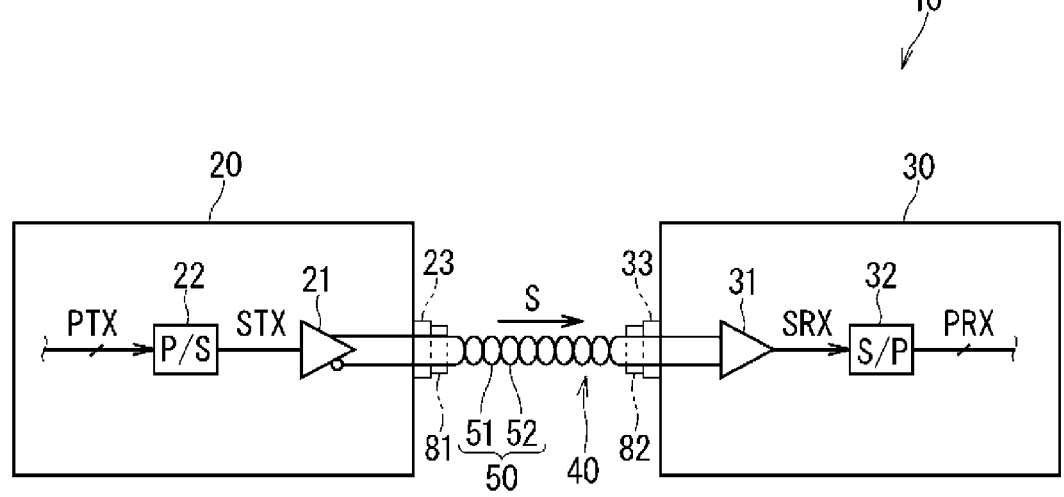
FIG. 2 is a schematic block diagram showing the in-vehicle communication system according to the first embodiment.
Figure 3:
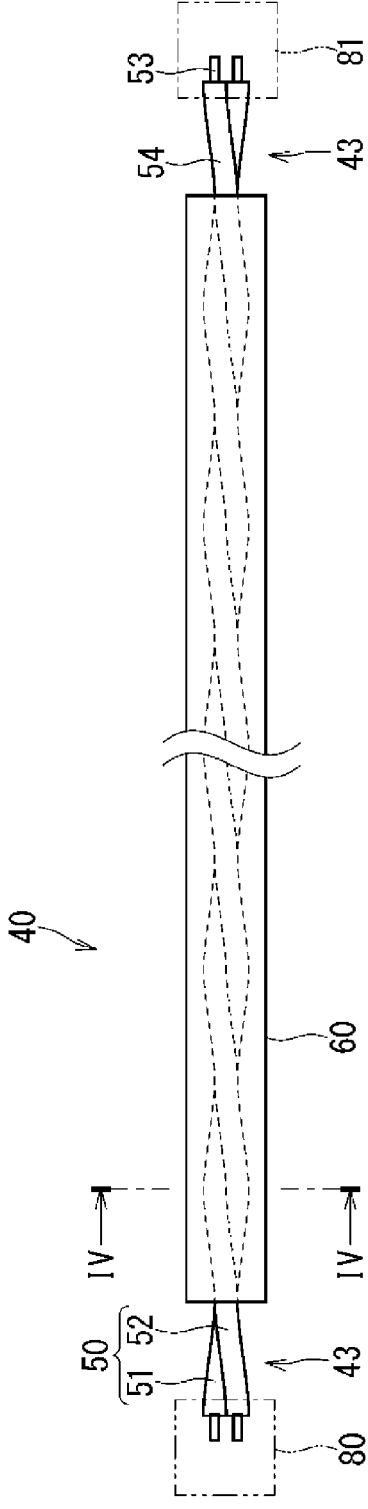
FIG. 3 is a plan view showing a communication cable.
Figure 4:
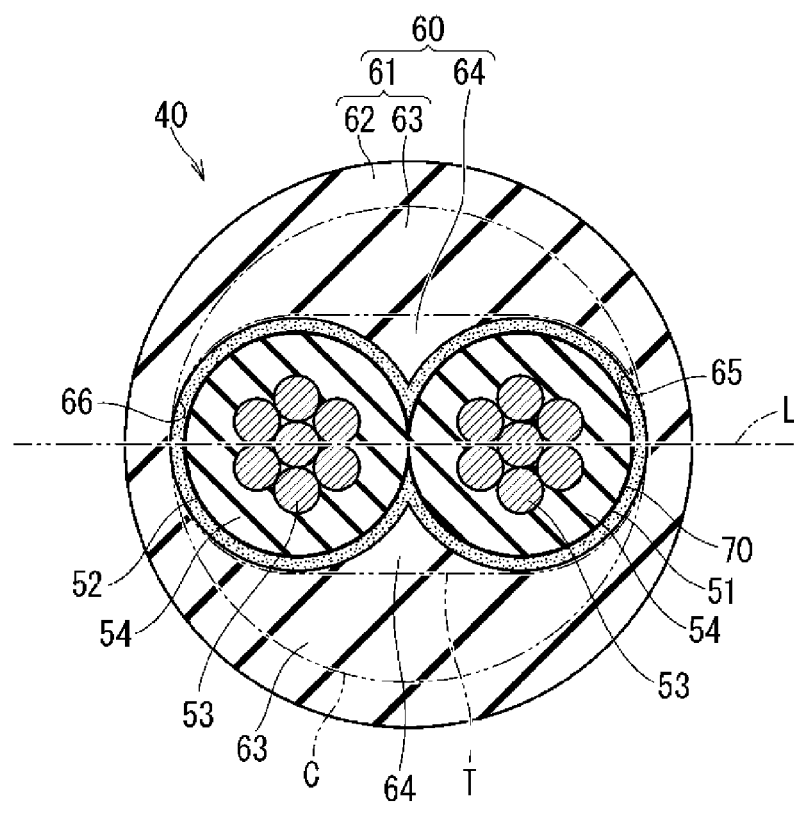
FIG. 4 is a cross-sectional view along line IV-IV in FIG. 3.
Figure 5:
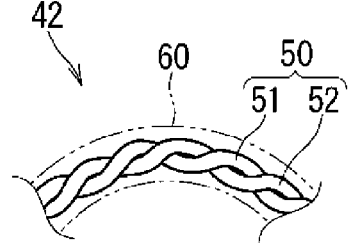
FIG. 5 is a diagram illustrating an example of a bent section of a communication cable.
Figure 6:
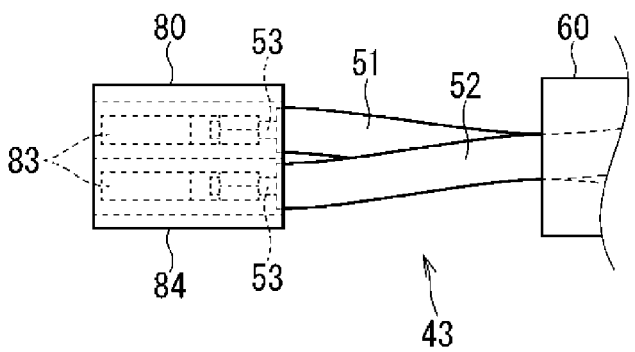
FIG. 6 is a diagram showing an end portion of the communication cable.

Hereinafter, an in-vehicle communication system according to a first embodiment will be described. FIG. 1 is a schematic diagram showing an in-vehicle communication system 10 according to the first embodiment. FIG. 2 is a schematic block diagram showing the in-vehicle communication system 10 according to the first embodiment. FIG. 3 is a plan view showing a communication cable 40. FIG. 4 is a cross-sectional view along line IV-IV in FIG. 3. FIG. 5 is a diagram showing a bent section 42 of the communication cable 40. FIG. 6 is a diagram showing an end portion of the communication cable 40.

The in-vehicle communication system 10 includes a transmitter 21, a receiver 31, and the communication cable 40. The transmitter 21 transmits a differential signal. The receiver 31 receives the differential signal. The transmitter 21 and the receiver 31 are disposed at positions spaced apart from each other in a vehicle 90. The communication cable 40 connects between the transmitter 21 and the receiver 31 and transmits the differential signal.

In the example shown in FIG. 2, the in-vehicle communication system 10 includes a first ECU (electronic control unit) 20 and a second ECU 30. The first ECU 20 includes the transmitter 21 and the second ECU 30 includes the receiver 31. The communication cable 40 connects between the first ECU 20 and the second ECU 30. The ECUs 20 and 30 may each include both the transmitter 21 and the receiver 31, and the first ECU 20 and the second ECU 30 may be provided to be capable of bidirectional communication via the communication cable 40.

In addition to the transmitter 21, the first ECU 20 includes a parallel-serial converter 22 and a first ECU-side connector 23. Parallel data PTX to be transmitted to the second ECU 30 is generated inside or outside the first ECU 20. The contents of the parallel data PTX are not particularly limited, and may, for example, be image data, audio data, and the like. The parallel-serial converter 22 converts the parallel data PTX into serial data STX. The first ECU 20 is connected to one end of the communication cable 40 via the first ECU-side connector 23. The transmitter 21 is coupled to the one end of the communication cable 40, and drives communication cable 40 according to the serial data STX. The serial data STX is thereby transmitted from the first ECU 20 to the second ECU 30.

In addition to the receiver 31, the second ECU 30 includes a serial-parallel converter 32 and a second ECU-side connector 33. The second ECU 30 is connected to an opposite end of the communication cable 40 via the second ECU-side connector 33. The receiver 31 is coupled to the opposite end of the communication cable 40, and receives serial data S transmitted from the first ECU 20. The serial-parallel converter 32 converts serial data SRX received by the receiver 31 into parallel data PRX. The parallel data PRX is supplied to a circuit block not shown.

The communication cable 40 is routed between the transmitter 21 and the receiver 31 so as to have a straight section 41 and bent sections 42. Here, a section of the communication cable 40 in the extension direction thereof is the straight section 41 extending in a straight line, and other sections thereof are the bent sections 42 extending in a bent manner.

The straight section 41 is a section between the transmitter 21 and the receiver 31, and extends along a straight path. The cable length of the communication cable 40 in the vehicle 90 is shortened, due to the communication cable 40 being disposed in the straight section 41 so as to extend along the shortest path between two points.

The bent sections 42 are sections between the transmitter 21 and the receiver 31, and extend along a curved path. In the bent sections 42, the communication cable 40 can be routed to avoid places in the vehicle 90 that are not suitable for routing, by bending the communication cable 40. Places in the vehicle 90 that are not suitable for routing are, for example, places where there are obstacles, places where the cable 40 would cut cross the cabin, and places where the cable 40 would be exposed in the cabin.

The communication cable 40 includes a twisted wire 50, a sheath 60, and a talc layer 70.

The twisted wire 50 includes a first coated wire 51 and a second coated wire 52. The first coated wire 51 and the second coated wire 52 are twisted together.

The sheath 60 covers the twisted wire 50. Here, the sheath 60 covers only the twisted wire 50 and the talc layer 70. Other portions may be covered by the sheath 60 in addition to the twisted wire 50 and the talc layer 70. The sheath 60 is formed by a method such as a softened resin material being extrusion molded around the twisted wire 50 and the talc layer 70. The resin material that is the main component of the sheath 60 may be polypropylene (PP), polyvinyl chloride (PVC), or polyethylene (PE), for example. In addition to the resin material that is the main component, additives such as a plasticizer may be added to the sheath 60. The sheath 60 has a tubular part 61 and a pair of ribs 64.

The tubular part 61 surrounds the first coated wire 51 and the second coated wire 52. Here, in a transverse section of the communication cable 40, the outer shape of the sheath 60 is circular. Thus, here, the tubular part 61 has a cylindrical portion 62 and an inner portion 63. As shown in FIG. 4, a cross-section orthogonal to the longitudinal direction of the communication cable 40 is a transverse section of the communication cable 40.

The cylindrical portion 62 is a portion having a constant thickness and including an outermost portion of the sheath 60. The cylindrical portion 62 has the same thickness as the sheath 60 in the extension direction of a straight line (virtual line L in FIG. 4) connecting the central axis of the first coated wire 51 and the central axis of the second coated wire 52. The cylindrical portion 62 is, for example, the portion between a virtual line C in FIG. 4 and the outer surface of the sheath 60.

The inner portion 63 is a portion that protrudes inward from the cylindrical portion 62. The inner portion 63 is the portion between the cylindrical portion 62 and the ribs 64. The inner portion 63 is, for example, the portion between the virtual line C and a virtual line T in FIG. 4. The virtual line T includes common tangents of the talc layer 70 on the first coated wire 51 side and the talc layer 70 on the second coated wire 52 side in the portion where the first coated wire 51 and the second coated wire 52 face each other.

The paired ribs 64 each protrude inward of the communication cable 40 from the tubular part 61 to between the first coated wire 51 and the second coated wire 52. The ribs 64 protrude inward of the communication cable 40 from the inner portion 63. The ribs 64 are, for example, portions inward of the communication cable 40 relative to the virtual line T in FIG. 4. Distal ends of the ribs 64 protrude inward (virtual line L side) relative to the common tangents of the first coated wire 51 and the second coated wire 52. The interval between the distal ends of the ribs 64 is less than the diameter of the coated wires.

In a transverse section of the communication cable 40, the pair of ribs 64 are located across a straight line (virtual line L) connecting the conductor center of the first coated wire 51 and the conductor center of the second coated wire 52. The pair of ribs 64 demarcate the internal space of the tubular part 61 into a first space 65 and a second space 66. The first space 65 is a space in which the first coated wire 51 is disposed. The second space 66 is a space in which the second coated wire 52 is disposed. The distal ends of the paired ribs 64 are spaced apart from each other. The first space 65 and the second space 66 communicate with each other.

The pair of ribs 64 extend spirally in the extension direction of the communication cable 40. The pitch of the spirals of each of the paired ribs 64 is set at a constant pitch throughout the entire length of the section in which the paired ribs 64 are provided. The pair of ribs 64 are provided to extend throughout the entire length of the sheath 60.

The pair of ribs 64 demarcate the first space 65 and the second space 66 in both the straight section 41 and the bent sections 42.

The position of the first coated wire 51 within the sheath 60 and the position of the second coated wire 52 within the sheath 60 are regulated by the pair of ribs 64. The inter-conductor distance between the first coated wire 51 and the second coated wire 52 is constant in both the straight section 41 and the bent sections 42.

The sheath 60 may be formed to have a predetermined hardness. In the present embodiment, Shore A (JIS K 6253-3) is used as a measure of the hardness of the sheath 60. The predetermined hardness is a hardness that satisfies 40 to 100 Shore A inclusive. The hardness of the sheath 60 is preferably from 60 to 90 Shore A inclusive.

The hardness of the sheath 60 may be changed using any method. For example, the hardness of the sheath 60 can be changed by changing the degree of polymerization of the resin material that is the main component. Also, for example, the hardness of the sheath 60 can be changed by changing the composition of additives.

The talc layer 70 is provided between the twisted wire 50 and the sheath 60. The talc layer 70 is provided along the surface of the twisted wire 50. In a transverse section of the communication cable 40, the shape of the talc layer 70 is assumed to correspond to the shape of the surface of the twisted wire 50. Here, the talc layer 70 contacts both the twisted wire 50 and the sheath 60. The talc layer 70 contacts the outer surface of the twisted wire 50. The talc layer 70 contacts the inner surface of the sheath 60.

Here, the talc layer 70 is not provided between the first coated wire 51 and the second coated wire 52. An insulating coating 54 of the first coated wire 51 and an insulating coating 54 of the second coated wire 52 are in direct contact with each other between the paired ribs 64, not via the talc layer 70. The talc layer 70 is provided on the surfaces of the first coated wire 51 and the second coated wire 52 other than the portion where the first coated wire 51 and the second coated wire 52 contact each other. The talc layer 70 is provided along the entire inner surface of the sheath 60. Naturally, part of the talc layer 70 may be located between the first coated wire 51 and the second coated wire 52.

The talc layer 70 is formed, for example, by adhering powdered talc containing countless talc particles to the surface of the twisted wire 50. The powdered talc may be adhered to the surface of the twisted wire 50 by any method, examples of which including spraying powdered talc onto the twisted wire 50, or dipping the twisted wire 50 in a powdered talc bath.

The powdered talc of the talc layer 70 contains magnesium hydroxide and silicate. The powdered talc is white in color. The sheath 60 is a different color from the powdered talc. Note that the powdered talc may be the same color as the sheath 60, or powdered talc of various colors other than white may be employed. Powdered talc is able to reduce the influence on the communication characteristics of the communication cable 40, compared to use of other lubricants such as a liquid lubricant, for example.

The average particle size of the powdered talc in the talc layer 70 is, for example, from 1 μm to 20 μm inclusive. The average particle size of the powdered talc in the talc layer 70 may also be from 2 μm to 12 μm inclusive. The average particle size of the powdered talc in the talc layer 70 may also be from 3 μm to 6 μm inclusive. The average particle size of the powdered talc is derived using a particle size analyzer employing a laser diffraction/scattering method, for example.

One end portion and the opposite end portion of the communication cable 40 in the extension direction thereof are sheath outer sections 43 in which the twisted wire 50 extends outside the sheath 60. A first connector 80 is provided in the sheath outer section 43 of one end portion of the communication cable 40. The first connector 80 connects the twisted wire 50 to the transmitter 21. A second connector 81 is provided in the sheath outer section 43 of the opposite end portion of the communication cable 40. The second connector 81 connects the twisted wire 50 to the receiver 31.

The first connector 80 includes a pair of connector terminals 82 and a connector housing 83. The second connector 81 also similarly includes a pair of connector terminals 82 and a connector housing 83.

Each connector terminal 82 has a wire connection portion and a mating connection portion. The wire connection portion of one of the paired connector terminals 82 is connected to an end portion of the first coated wire 51. The wire connection portion of the other of the paired connector terminals 82 is connected to an end portion of the second coated wire 52. The mode of connecting the wire connection portions of the connector terminals 82 to core wires 53 of the coated wires is not particularly limited, and connection can, for example, be achieved by methods such as crimping, pressure welding, and welding.

The connector housing 83 is molded with a resin or the like having insulating properties. The connector housing 83 houses the pair of connector terminals 82. The end portions of the coated wires that are connected to the connector terminals 82 are also housed in the connector housing 83. The connector housing 83 may be a part molded separately from the connector terminals 82 and the wire end portions, rather than constituting the connector terminals 82 and the wire end portions as insert parts. The connector terminals 82 and the wire end portions may be inserted into cavities of the connector housing 83. The connector housing 83 may also be an insert-molded part with the connector terminals 82 and the wire end portions as insert parts.

The communication quality of the communication cable 40 is, for example, related to characteristic impedance. The characteristic impedance of the communication cable 40 can change depending on the state of the communication cable 40. The characteristic impedance of the general communication cable 40 is measured with the communication cable 40 in an unbent state. For example, the method of measuring the characteristic impedance of the communication cable 40 in a straight state conforms to a measurement method defined in IEC 62153-1-1.

A method of measuring the characteristic impedance of the communication cable 40 in a bent state conforms to the measurement method defined in IEC 62153-1-1 described above except for the following point. Measurement typically performed with the measurement sample straight is performed with an intermediate portion thereof bent once around with a bending radius of 20 mm. The measurement sample bent once around is bent independently without being wound around an object. This is because the characteristic impedance measurement result could possibly be affected when the measurement sample is wound around an object. The characteristic impedance of the communication cable 40 in a bent state measured by the above measurement method may be from 90Ω to 110Ω inclusive, and is preferably from 94 Ω to 106 Ω inclusive, and more preferably from 97Ω to 103Ω inclusive.

The value of the characteristic impedance of the communication cable 40 in a fatigue test that is defined in ISO 19642-2 and uses a weight of 300 g and a mandrel diameter of 15 mm may be from 90Ω to 110Ω inclusive, and is preferably from 94Ω to 106Ω inclusive, and more preferably from 97Ω to 103Ω inclusive.

Effects and Related Matters

According to the in-vehicle communication system 10 and the communication cable 40 constituted in this way, the talc layer 70 is provided along the surface of the twisted wire 50, and thus does not impede the ribs 64 from entering between the first coated wire 51 and the second coated wire 52. Because the positions through which the first coated wire 51 and the second coated wire 52 pass can be regulated by the pair of ribs 64, it is thereby possible to reduce noise caused by variation in the relative positional relationship between the wires of the twisted wire 50, which is a problem with the communication cable 40. Furthermore, the talc layer 70 facilitates stripping the sheath 60 of the communication cable 40.

Also, a section of the communication cable 40 in the extension direction thereof is the straight section 41 that extends in a straight line, and other sections thereof are the bent sections 42 that extend in a bent manner, and the pair of ribs 64 demarcate the first space 65 and the second space 66 in both the straight section 41 and the bent sections 42. In both the straight section 41 and the bent sections 42, the positional relationship between the first coated wire 51 and the second coated wire 52 can thereby be favorably regulated.

Also, the inter-conductor distance between the first coated wire 51 and the second coated wire 52 is constant in both the straight section 41 and the bent sections 42. It is thereby possible to reduce noise caused by variation in the relative positional relationship between the wires of the twisted wire 50, which is a problem with the communication cable 40.

Also, the pair of ribs 64 are provided to extend throughout the entire length of the sheath 60. The positional relationship between the first coated wire 51 and the second coated wire 52 can thereby be favorably regulated throughout the entire length of the sheath 60.

Also, the distal ends of the paired ribs 64 are spaced apart from each other, with the first space 65 and the second space 66 communicating with each other between the paired ribs 64, and the insulating coating 54 of the first coated wire 51 and the insulating coating 54 of the second coated wire 52 being in direct contact with each other not via the talc layer 70. The inter-conductor distance between the first coated wire 51 and the second coated wire 52 and the diameter of the communication cable 40 can thereby be reduced.

Also, the pitch of the spirals of each of the paired ribs 64 is set to be constant throughout the entire length of the section in which the paired ribs 64 are provided. Keeping the first coated wire 51 and the second coated wire 52 that pass through the first space 65 and the second space 66 demarcated by the pair of ribs 64 at a constant pitch is thereby facilitated.

Also, one end portion and the opposite end portion of the communication cable 40 in the extension direction thereof are sheath outer sections 43 in which the twisted wire 50 extends outside the sheath 60, with the first connector 80 for connecting the twisted wire 50 to the transmitter 21 being provided in the sheath outer section 43 of one end portion, and the second connector 81 for connecting the twisted wire 50 to the receiver 31 being provided in the sheath outer section 43 of the opposite end portion. The communication cable 40 can thereby be easily connected to the transmitter 21 and the receiver 31.

Also, the sheath 60 covers only the twisted wire 50 and the talc layer 70. The structure of the communication cable 40 is thereby simplified and costs are reduced.

Also, the powdered talc of the talc layer 70 contains magnesium hydroxide and silicate, and the powdered talc is white in color, with the sheath 60 being a different color from the powdered talc. Completion of stripping when the sheath 60 is stripped is thereby easily recognized by checking the color of the stripped portion.

The average particle size of the powdered talc in the talc layer 70 is from 1 μm to 20 μm. Favorable strippability and favorable characteristic impedance are thereby easily obtained with the communication cable 40.

Also, when the communication cable 40 is used in a vehicle, the communication line characteristics are desirably within a reference range. The communication line characteristics are generally evaluated with the characteristic impedance under typical conditions. When the communication cable 40 is routed in a vehicle, at least a section thereof can also be disposed along a curved path. The communication characteristics (characteristic impedance) in a bent state are thus also desirably within the reference range. The characteristic impedance of the communication cable 40 in a bent state is measured with a measurement method conforming to the measurement method defined in IEC 62153-1-1 described above, except for the following point. The measurement sample is measured in a bent posture instead of a typical straight posture. The bent posture is a posture in which an intermediate portion of the measurement sample is bent once around to form a loop having a bending radius of 20 mm, and the loop is hollow inside. In other words, measurement typically performed with the measurement sample straight is performed with an intermediate portion thereof bent once around with a bending radius of 20 mm. The measurement sample bent once around is bent independently without being wound around an object. The characteristic impedance in a bent state may be from 90 Ω to 110Ω inclusive, and is preferably from 94 Ω to 106 Ω inclusive, and more preferably from 97 Ω to 103Ω inclusive. Favorable characteristic impedance can thereby be easily obtained, even if the communication cable 40 is disposed in the vehicle 90 in a bent manner.

Also, when the communication cable 40 is used in a vehicle, the communication line characteristics are desirably within a reference range. The communication line characteristics are generally evaluated with the characteristic impedance under typical conditions. When the communication cable 40 is disposed in a vehicle, degradation caused by the communication cable 40 being repeatedly flexed due to vibration is a concern. The communication characteristics (characteristic impedance) after repeated bending are thus also desirably within a reference range. The value of the characteristic impedance of the communication cable 40 in a fatigue test that is defined in ISO 19642-2 and uses a weight of 300 g and a mandrel diameter of 15 mm may be from 90 Ω to 110 Ω inclusive, and is preferably from 94 Ω to 106 Ω inclusive, and more preferably from 97Ω to 103Ω inclusive. The communication cable 40 disposed in the vehicle 90 is prone to repeated bending due to vibration or the like. Favorable characteristic impedance is also easily obtained in this case, even with the communication cable 40 after long-term use, due to the value of characteristic impedance after the above fatigue test being from 90Ω to 110Ω inclusive, preferably being from 94 Ω to 106 Ω inclusive, and more preferably being from 97Ω to 103Ω inclusive.

Examples

In the present embodiment, evaluations of the characteristic impedance before bending, the characteristic impedance in a bent state, the characteristic impedance after repeated bending, and strippability will be described with regard to samples S1 to S13 in which the configuration of the communication cable 40 is changed. The evaluations were derived by a characteristic impedance measurement test and a stripping test.

<Regarding the Samples>

The communication cables of samples S1 to S7 were all obtained by changing the average particle size of the talc powder in a range of 1 μm to 20 μm under conditions where the ribs were provided and the sheath hardness was optimal. Here, the "optimal" sheath hardness is from 60 to 90 Shore A inclusive. Specifically, the average particle sizes of the talc powder in the communication cables of samples S1 to S7 was "1 μm", "2 μm", "3 μm", "4 μm", "6 μm", "12 μm", and "20 μm", respectively. The talc layers of the communication cables of samples S1 to S7 can change in thickness due to the difference in average particle size of the talc powder. The communication cables of samples S1 to S7 basically have similar transverse sections to the communication cable 40 shown in FIG. 4, other than the thickness of the talc layer.

The communication cables of samples S8 to S13 were obtained based on the communication cable of sample S4, with one of the conditions relating to provision of the ribs, sheath hardness, and provision of the talc layer being changed.

Figure 9:
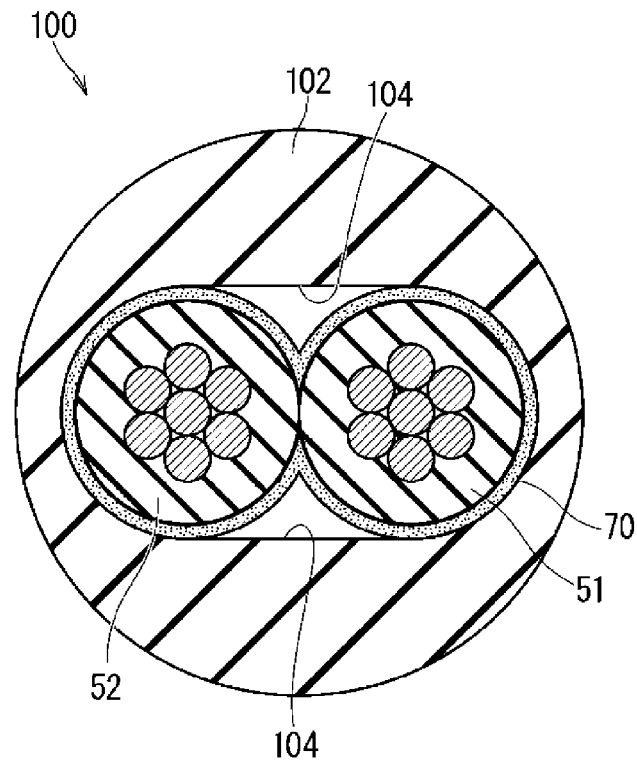
FIG. 9 is a cross-sectional view showing a communication cable of sample S8.

The communication cable of sample S8 was obtained based on the communication cable of sample S4, with only the condition relating to provision of the ribs being changed from sample S4 to "no". The communication cable of sample S8 has a different transverse section from the communication cable 40 shown in FIG. 4 due to changing provision of the ribs to "no". FIG. 9 is a cross-sectional view showing a communication cable 100 of sample S8.

A sheath 102 of the communication cable 100 of sample S8 does not have the ribs 64 that enter between the first coated wire 51 and the second coated wire 52. In the example shown in FIG. 9, the sheath 102 corresponds in shape to the tubular part 61 of the sheath 60. The inner surface of the sheath 102 follows lines corresponding to the common tangents of the first coated wire 51 and the second coated wire 52. An empty space 104 is formed inside the sheath 102. The space 104 is provided on both sides of a line passing through the conductor center of the first coated wire 51 and the conductor center of the second coated wire 52. The space 104 extends spirally in the extension direction of the communication cable 100.

The communication cables of samples S9 to S12 were obtained based on the communication cable of sample S4, with only the condition relating to sheath hardness being changed from the communication cable of sample S4 to "soft", "fairly soft", "fairly hard", and "hard", respectively. The communication cables of samples S9 to S12 have similar transverse sections to the communication cable shown in FIG. 4. "Soft" is a hardness less than 40 Shore A. "Fairly soft" is a hardness of about 50 Shore A, and is from greater than or equal to 40 Shore A to less than 60 Shore A. "Fairly hard" is a hardness of about 95 Shore A, and is in excess of 90 Shore A and less than or equal to 100 Shore A. "Hard" is a hardness in excess of 100 Shore A.

Figure 10:
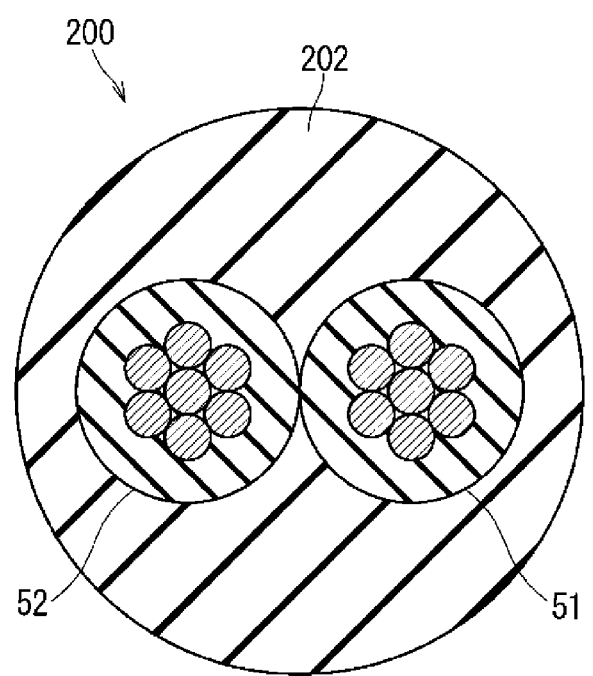
FIG. 10 is a cross-sectional view showing a communication cable of sample S13.

The communication cable of sample S13 was obtained based on the communication cable of sample S4, with only the condition relating to the talc layer being changed from the communication cable of sample S4 to "—(NO)". The communication cable of sample S13 has a different transverse section from the communication cable 40 shown in FIG. 4 due to the changing the condition relating to the talc layer to "—(NO)". FIG. 10 is a cross-sectional view showing a communication cable 200 of sample S13.

The communication cable 200 of sample S13 is not provided with the talc layer 70. A sheath 202 of the communication cable 200 thus directly contacts the insulating coating 54 of the first coated wire 51 and the insulating coating 54 of the second coated wire 52, as shown in FIG. 10. The resin of the sheath 202 and the resin of the insulating coating 54 can be fused in portions where the sheath 202 and the insulating coating 54 are in direct contact with each other.

<Evaluation Symbols>

In FIGS. 7 and 8, the symbol "⊚" for characteristic impedance evaluation and strippability evaluation means that the evaluation result is "Excellent". Also, the symbol "○" means that the evaluation result is "Good". Also, the symbol "Δ" means that the evaluation result is "Passing". On the other hand, the symbol "x" means that the evaluation result is "Failing".

<Characteristic Impedance Evaluation>

In the characteristic impedance evaluation, a characteristic impedance from 97Ω to 103Ω inclusive was rated as "⊚". Also, a characteristic impedance from 94 Ω to 106Ω inclusive that did not satisfy "⊚" was rated as "○". Also, a characteristic impedance from 90Ω to 110Ω inclusive that did not satisfy "⊚" or "○" was rated as "Δ". Also, a characteristic impedance that did not satisfy 90Ω to 110Ω inclusive was rated as "x".

<Regarding Samples S1 to S7>

For samples S1 to S7 in which the average particle size of the talc powder was changed under conditions where the ribs were provided and the sheath hardness was optimal, evaluation of characteristic impedance before bending, evaluation of characteristic impedance in a bent state, and evaluation of characteristic impedance after repeated bending were "Δ" or higher for all of the samples. Also, in relation to each of samples S1 to S7, the evaluation result was unchanged in the evaluation of characteristic impedance before bending, the evaluation of characteristic impedance in a bent state and the evaluation of characteristic impedance after repeated bending.

Among samples S1 to sample S7, the evaluations of sample S1 having an average particle size of talc powder of "1 μm" and sample S7 having an average particle size of talc powder of "20 μm" were "Δ". Also, the evaluations of sample S2 having an average particle size of talc powder of "2 μm" and sample S7 having an average particle size of talc powder of "12 μm" were "○". Also, the evaluations of samples S3 to S5 having an average particle size of "3 μm" to "6 μm" of talc powder were "◎".

<Regarding Samples S8 to S13>

For samples S8 to S13 which were obtained based on sample S4 with one of the conditions relating to provision of the ribs, sheath hardness, and provision of the talc layer being changed, the evaluations of characteristic impedance before bending were all "◎". Among samples S8 to S13, the evaluation of characteristic impedance in a bent state and evaluation of characteristic impedance after repeated bending of sample S8 not provided with the ribs were "Δ" and "x", respectively. Among samples S8 to S13, the evaluation of characteristic impedance in a bent state and evaluation of characteristic impedance after repeated bending of samples S9 and S11 having sheath hardnesses of "soft" and "fairly hard", respectively, were both "○". Also, the evaluation of characteristic impedance in a bent state of sample S10 having a sheath hardness of "fairly soft" was "◎". Also, for sample S12 having a sheath hardness of "hard", the insulating coating cracked when the sample was bent, and thus the evaluation of characteristic impedance in a bent state and the evaluation of characteristic impedance after repeated bending could not be evaluated. Among samples S8 to S13, the evaluation of characteristic impedance in a bent state and the evaluation of characteristic impedance after repeated bending of sample S13 not provided with the talc layer were both "◎".

Regarding the characteristic impedance evaluation, an improvement in characteristic impedance in a bent state and after repeated bending was observed as a result of the ribs being provided. Also, when the talc layer was provided, an improvement in characteristic impedance was observed as the average particle size of the talc powder approached a range from "3 μm" to "6 μm". Also, an improvement in characteristic impedance in a bent state and after repeated bending was observed as a result of the sheath hardness approaching the optimal hardness.

<Regarding Stripping Evaluation>

In the stripping evaluation, samples with the best strippability were rated as "◎". Also, samples with good strippability were rated as "○". Also, samples with passable strippability were rated as "Δ". Also, samples with poor strippability were rated as "x".

In the stripping evaluation, the evaluation of sample S13 not provided with the talc layer was "x", and the evaluation of samples S1 to S12 provided with the talc layer was "Δ" or higher.

Among samples S1 to S7 in which the average particle size of the talc powder was changed, the evaluation of sample S1 having an average particle size of talc powder of "1 μm" was "A". Also, the evaluation of sample S2 having an average particle size of talc powder of "2 μm" was "○". Also, the evaluations of samples S3 to S7 having an average particle size of talc powder from "3 μm" to "20 μm" were "◎".

The evaluation of sample S8 having the same average particle size of talc powder and sheath hardness as sample S4 and not provided with the ribs was "◎".

The evaluations of samples S9 to S12 in which provision of the ribs and the average particle size of the talc powder was the same as sample S4 and the sheath hardness was different from sample S4 were "○" or "Δ".

Regarding the stripping evaluation, an improvement in strippability was observed as a result of the talc layer. Also, an improvement in strippability was observed as a result of an increase in the average particle size of the talc powder. Also, an improvement in strippability was observed as a result of the sheath hardness approaching the optimal hardness.

[Supplementary Notes]

In the above description, the distal ends of the paired ribs 64 are spaced apart from each other, with the first space 65 and the second space 66 communicating with each other between the paired ribs 64, and the insulating coating 54 of the first coated wire 51 and the insulating coating 54 of the second coated wire 52 being in direct contact with each other not via the talc layer 70, but this configuration is not essential. For example, the insulating coating 54 of the first coated wire 51 and the insulating coating 54 of the second coated wire 52 may be in contact with each other via the talc layer 70. The talc layer 70 may be provided around the entire circumference of at least one of the first coated wire 51 and the second coated wire 52.

Figure 11:
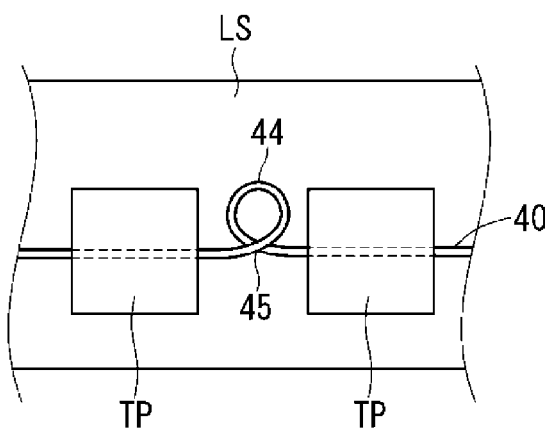
FIG. 11 is a diagram showing a bent posture of the communication cable when measuring characteristic impedance in a bent state.

The bent posture of the communication cable 40 when measuring the characteristic impedance in a bent state will be described more specifically with reference to FIG. 11. FIG. 11 is a diagram showing the bent posture of the communication cable 40 when measuring the characteristic impedance in a bent state. As shown in FIG. 11, the bent posture is a posture in which an intermediate portion of the communication cable 40 is bent once around to form a loop 44, and the loop 44 is hollow inside. The loop 44 is circular in shape with a radius of 20 mm. The section of the communication cable 40 that includes the loop 44 is supported on a flat horizontal surface LS such as the upper surface of a platform or a floor surface. The loop 44 is provided with an overlapping portion 45 where part of the communication cable 40 overlaps another part thereof. In the overlapping portion 45, a portion extending from the center of the section forming the loop 44 toward one end overlaps a portion extending toward the opposite end. The overlapping portion 45 is provided such that part of the communication cable 40 overlaps another part thereof on the horizontal surface LS. The axial direction of the loop 44 is thereby orthogonal to the horizontal surface LS.

In order to facilitate keeping the circular shape of the loop 44, the communication cable 40 may be fixed to the horizontal surface LS by an adhesive tape TP or the like. The parts fixing the communication cable 40 to the horizontal surface LS may be located at any position that keeps the circular shape of the loop 44, which may be positions in the loop 44, but is preferably positions other than the loop 44. The positions other than the loop 44 may be in the vicinity of the loop 44 or may be positions spaced apart from the loop 44. For example, in the example shown in FIG. 11, fixing parts are provided at positions spaced apart from the overlapping portion 45 by around the diameter of the loop 44. In the example shown in FIG. 11, the fixing part at one end and the fixing part at the opposite end with respect to the loop 44 are provided at positions that are the same distance from the overlapping portion 45, but may be provided at positions that are different distances from the overlapping portion 45.

The loop 44 may be formed using a guide member, for example. The guide member is a columnar member having a 20 mm radius. The guide member stands erect on the horizontal surface LS. The loop 44 is formed by winding the communication cable 40 around the guide member. The loop 44 is held due to portions of the communication cable 40 on one end side and the opposite end side relative to the guide member being fixed to the horizontal surface LS by the adhesive tape TP or the like. After the loop 44 is formed (fixed with the adhesive tape TP), the guide member is removed from the horizontal surface LS such that the loop 44 is hollow inside as shown in FIG. 11. The loop 44 is easily formed into a regular circular shape, as a result of being formed using the guide member.

Note that the configurations described in the above embodiments and modifications can be combined as appropriate, as long as there are no mutual inconsistencies.

LIST OF REFERENCE NUMERALS

10 In-vehicle communication system
20 First ECU
21 Transmitter
22 Parallel-serial converter
23 First ECU-side connector
30 Second ECU
31 Receiver
32 Serial-parallel converter
33 Second ECU-side connector
40 Communication cable
41 Straight section
42 Bent section
43 Sheath outer section
44 Loop
45 Overlapping portion
50 Twisted wire
51 First coated wire
52 Second coated wire
53 Core wire
54 Insulating coating
60 Sheath
61 Tubular part
62 Cylindrical portion
63 Inner portion
64 Rib
65 First space
66 Second space
70 Talc layer
80 First connector
81 Second connector
82 Connector terminal
83 Connector housing
90 Vehicle
100, 200 Communication cable
102, 202 Sheath
104 Space
LS Horizontal surface
TP Adhesive tape

What is claimed is:

1. An in-vehicle communication system comprising: a transmitter configured to transmit a differential signal; a receiver configured to receive the differential signal; and a communication cable connecting between the transmitter and the receiver and configured to transmit the differential signal, wherein the communication cable includes: a twisted wire in which a first coated wire and a second coated wire are twisted together; a sheath covering the twisted wire; and a talc layer provided between the twisted wire and the sheath, the sheath includes: a tubular part surrounding the first coated wire and the second coated wire; and a pair of ribs each extending spirally in an extension direction of the communication cable while protruding inward of the communication cable from the tubular part to between the first coated wire and the second coated wire, in a transverse section of the communication cable, the pair of ribs are located across a straight line connecting a conductor center of the first coated wire and a conductor center of the second coated wire, so as to demarcate a first space in which the first coated wire is disposed and a second space in which the second coated wire is disposed, the talc layer is provided along a surface of the twisted wire, a section of the communication cable in the extension direction is a straight section extending in a straight line, and another section thereof is a bent section extending in a bent manner, the pair of ribs demarcate the first space and the second space in both the straight section and the bent section, an inter-conductor distance between the first coated wire and the second coated wire is constant in both the straight section and the bent section, and an insulating coating of the first coated wire and an insulating coating of the second coated wire are not fused together.

2. The in-vehicle communication system according to claim 1, wherein the pair of ribs are provided to extend throughout an entire length of the sheath.

3. The in-vehicle communication system according to claim 1,
wherein distal ends of the paired ribs are spaced apart from each other, and
between the paired ribs, the first space and the second space communicate with each other, and the insulating coating of the first coated wire and the insulating coating of the second coated wire are in direct contact with each other not via the talc layer.

4. The in-vehicle communication system according to claim 1, wherein a pitch of spirals of each of the paired ribs is set to be constant throughout an entire length of the section in which the pair of ribs are provided.

5. The in-vehicle communication system according to claim 1,
wherein one end portion and an opposite end portion of the communication cable in the extension direction are sheath outer sections in which the twisted wire extends outside the sheath, and
a first connector for connecting the twisted wire to the transmitter is provided in the sheath outer section of the one end portion, and a second connector for connecting the twisted wire to the receiver is provided in the sheath outer section of the opposite end portion.

6. The in-vehicle communication system according to claim 1, wherein the sheath covers only the twisted wire and the talc layer.

7. The in-vehicle communication system according to claim 1,
wherein powdered talc of the talc layer includes magnesium hydroxide and silicate,
the powdered talc is white in color, and
the sheath is a different color from the powdered talc.

8. The in-vehicle communication system according to claim 1, wherein the powdered talc of the talc layer has an average particle size from 1 μm to 20 μm.

9. The in-vehicle communication system according to claim 1, wherein a value of characteristic impedance of the communication cable in a bent state is from 94 Ω to 106 Ω inclusive measured with a characteristic impedance measurement method conforming to a measurement method defined in IEC 62153-1-1, except for a measurement sample being measured in a bent posture instead of a typical straight posture, where the bent posture is a posture in which an intermediate portion of the measurement sample is bent once around to form a loop having a bending radius of 20 mm, and the loop is hollow inside.

10. The in-vehicle communication system according to claim 1, wherein the value of the characteristic impedance of the communication cable is from 94 Ω to 106 Ω inclusive measured with the measurement method conforming to IEC 62153-1-1, after a fatigue test that is defined in ISO 19642-2 and uses a weight of 300 g and a mandrel having a diameter of 15 mm.

11. A communication cable for use in an in-vehicle communication system configured to transmit and receive a differential signal, the communication cable comprising:

a twisted wire in which a first coated wire and a second coated wire are twisted together;

a sheath collectively covering the twisted wire; and a talc layer provided between the twisted wire and the sheath, wherein the sheath includes:

a tubular part surrounding the first coated wire and the second coated wire; and a pair of ribs each extending spirally in an extension direction of the communication cable while protruding inward of the communication cable from the tubular part to between the first coated wire and the second coated wire, in a transverse section of the communication cable, the pair of ribs are located across a straight line connecting a conductor center of the first coated wire and a conductor center of the second coated wire, so as to demarcate a first space in which the first coated wire is disposed and a second space in which the second coated wire is disposed, the talc layer is provided along a surface of the twisted wire, a section of the communication cable in the extension direction is a straight section extending in a straight line, and another section thereof is a bent section extending in a bent manner, the pair of ribs demarcate the first space and the second space in both the straight section and the bent section, an inter-conductor distance between the first coated wire and the second coated wire is constant in both the straight section and the bent section, and an insulating coating of the first coated wire and an insulating coating of the second coated wire are not fused together.

* * * * *